(12) United States Patent
Ishigaki et al.

(10) Patent No.: US 6,433,308 B1
(45) Date of Patent: *Aug. 13, 2002

(54) HIGH VACUUM VALVE

(75) Inventors: Tsuneo Ishigaki, Saitama-ken; Keiichi Shibuya, Hasuda; Mamoru Fukuda, Urawa; Kenji Waragai, Ibaraki-ken, all of (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/674,518

(22) PCT Filed: Apr. 26, 1999

(86) PCT No.: PCT/JP99/02217

§ 371 (c)(1),
(2), (4) Date: Nov. 20, 2000

(87) PCT Pub. No.: WO99/60294

PCT Pub. Date: Nov. 25, 1999

(30) Foreign Application Priority Data

May 20, 1998 (JP) .............................. 10-153675

(51) Int. Cl.[7] .......................... H05B 1/00; F16K 49/00
(52) U.S. Cl. ....................................... 219/201; 137/341
(58) Field of Search ............................... 219/201, 538, 219/539, 406, 407; 137/341; 251/11, 159, 158

(56) References Cited

U.S. PATENT DOCUMENTS

| 3,733,459 | A | | 5/1973 | Lengstorf | 219/201 |
|---|---|---|---|---|---|
| 4,401,487 | A | * | 8/1983 | Lockwood | 117/67 |
| 4,878,512 | A | * | 11/1989 | Pirkel | 137/341 |
| 5,755,255 | A | * | 5/1998 | Iwabuchi | 137/341 |
| 5,915,410 | A | * | 6/1999 | Zajac | 137/341 |
| 5,941,271 | A | * | 8/1999 | Chovan | 137/341 |
| 6,095,180 | A | * | 8/2000 | Ishigaki et al. | 137/341 |

FOREIGN PATENT DOCUMENTS

| EP | 0 802 363 | 10/1997 |
|---|---|---|
| JP | 9-269072 | 10/1997 |
| JP | 09-303577 A | 11/1997 |
| JP | 9-324863 | 12/1997 |

* cited by examiner

*Primary Examiner*—Sang Paik
(74) *Attorney, Agent, or Firm*—Paul A. Guss

(57) ABSTRACT

A high vacuum valve prevents the transfer of heat from a valve plug of a valve via a valve shaft to a low temperature portion. The high vacuum valve is constructed such that the valve plug arrives at a position opposed to a valve seat in accordance with rectilinear motion of the valve shaft and then the valve plug is pressed against the valve seat in accordance with swinging motion of the valve shaft to close the valve.

9 Claims, 5 Drawing Sheets

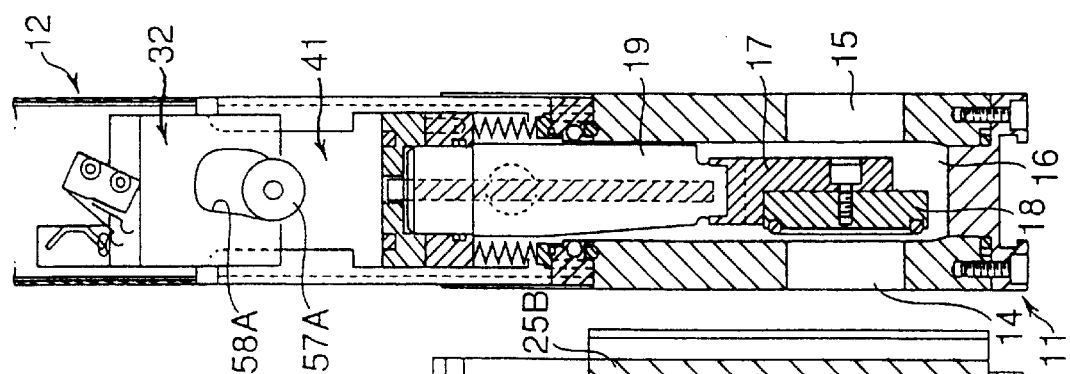
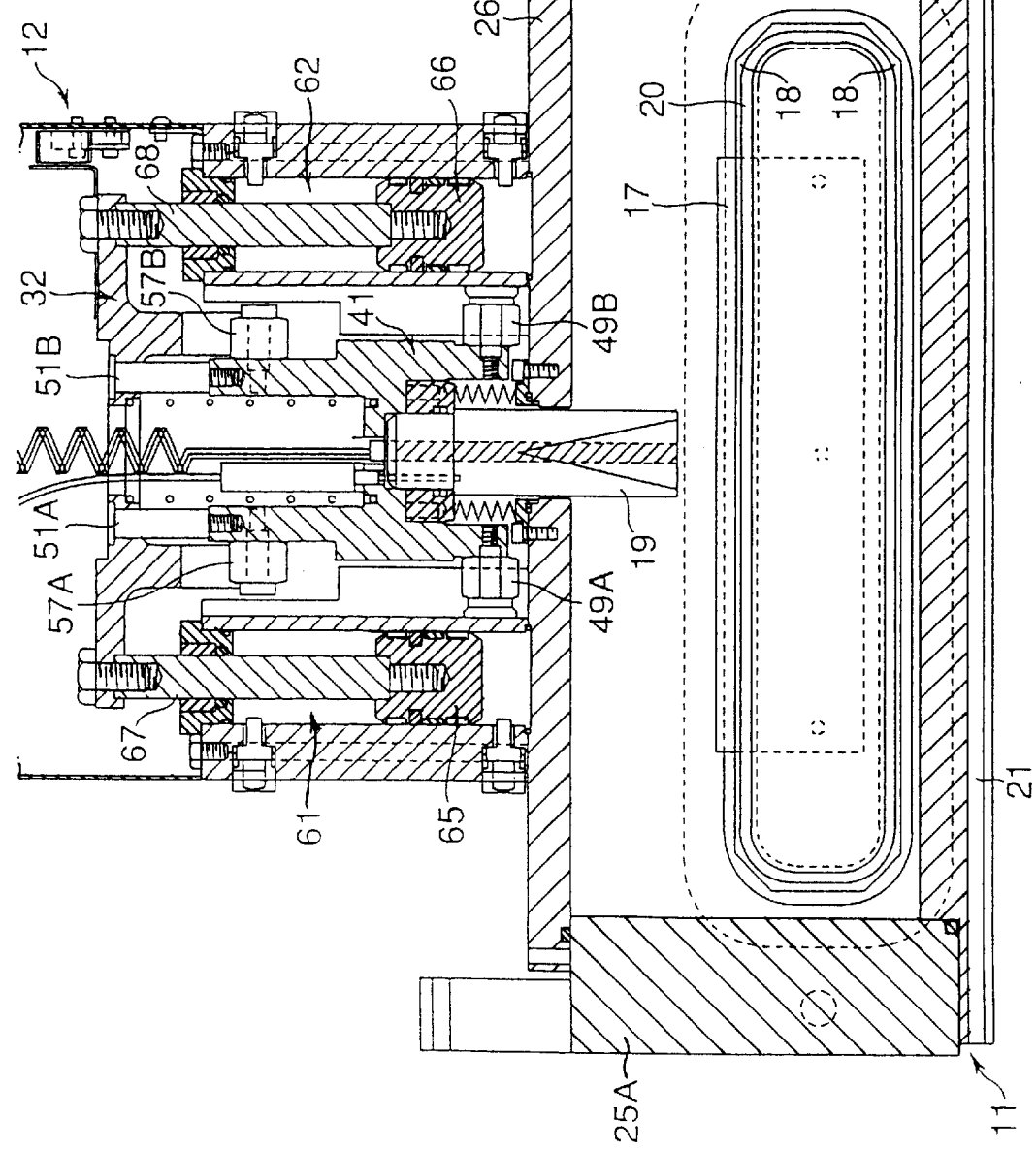

HIGH VACUUM VALVE

BACKGROUND OF THE INVENTION

1. Field of the Invention

The present invention relates to a high vacuum valve for opening/closing a transport passage and a discharge passage for the vacuum (negative pressure). In particular, the present invention relates to a high vacuum valve which is arranged, for example, for a transport passage when a workpiece such as a wafer, an integrated circuit (IC), or a part thereof is transported from one vacuum processing chamber to another vacuum processing chamber, and/or which is arranged, for example, for a discharge passage for connecting a high vacuum processing chamber and a vacuum pump.

2. Description of the Related Art

A high vacuum valve for a transport passages is known (see, for example, Japanese Laid-Open Patent Publication No. 9-303577), in which a first opening and a second opening are formed at a front surface wall and a back surface wall of a main valve body having a valve chamber (chamber) at the inside respectively, a valve seat is formed at an inner portion of the first opening or the second opening, a valve plug (gate, blade) is connected to a proximal end of a valve shaft for performing rectilinear motion, and the valve plug is pressed against the valve seat to close the valve. In the high vacuum valve, the valve shaft is inserted into a central bore of an upper wall of the entire valve in a non-contact state. A side surface portion of the valve shaft disposed outside the valve chamber is covered with a bellows in a non-contact state. An air-tight state is established between the forward end of the bellows and the forward end of the valve shaft, and an air-tight state is established between the proximal end of the bellows and the surroundings of the central bore of the upper wall.

The high vacuum valve (gate valve) for the transport passage as described above is constructed such that the valve plug arrives at the position opposed to the valve seat in accordance with the rectilinear motion of the valve shaft, and then the valve plug is pressed against the valve seat in accordance with the swinging motion of the valve shaft. The following mechanism is used as a mechanism for pressing the valve plug against the valve seat. That is, an engaging section, which has a front surface and a back surface, is formed at the forward end of the valve shaft. The front surface and the back surface of the engaging section are engaged with a first engaging roller and a second engaging roller each of which is rotatably supported by a roller support member. When a support point roller, which is connected to the forward end of the valve shaft, is supported at a proximal end of a support point groove, the roller support member is moved frontwardly to engage the first engaging roller with the front surface engaging section. Accordingly, the valve shaft makes the swinging movement in the direction to press the valve plug against the valve seat.

A high vacuum valve (L-type valve) for a discharge passage involves the following problem. That is, when the temperature is not more than a certain temperature, a reaction product of a reaction gas adheres to the interior of the high vacuum valve, and it becomes difficult to control the high vacuum valve. It is required to realize a uniform temperature, for example, for an upper portion of a valve body, a valve flange of the valve body, a bellows-side flange of the valve body, and the outside portion of the valve.

Conventionally, in order to maintain a predetermined temperature or a higher temperature for the high vacuum valve, an aluminum material having a high coefficient of thermal conductivity is used for the body and the bonnet, a stainless steel material is used for the valve plug and the bellows, and a heater is attached to the outside of the body. In the case of such an arrangement, the body and the bonnet are allowed to make tight contact therebetween, the heat of the body is transferred to the bonnet made of the aluminum material, and the heat is transferred from the bonnet to the bellows and the valve plug.

On the other hand, although the aluminum material has the high coefficient of thermal conductivity, it is poor in strength and corrosion resistance. Therefore, it is demanded that the stainless steel material (SUS), which is excellent in strength and corrosion resistance, is used for the body. Accordingly, a high vacuum valve has been manufactured, which has the same structure and the same size provided that the material for the body is changed from the aluminum material to the SUS material. The temperature distribution of the high vacuum valve, which is obtained when the electricity is applied by a heater, is greatly dispersed concerning temperature depending on the measuring point, because the coefficient of thermal conductivity of the SUS material is about $1/12$ of that of the aluminum material. In the case of such a high vacuum valve, it is difficult to avoid the deposit (adhesion of the reaction product).

In the case of the high vacuum valve for the discharge passage described above, for example, in order to take out an wafer from the vacuum chamber to the atmospheric air, an inert gas such as nitrogen gas is introduced into the vacuum chamber in the vacuum state to break the vacuum state. During this process, the dust (particle), which adheres to the floor surface and the wall surface in the vacuum chamber and the piping is raised by the injected gas, and it floats over the interior of the chamber and the pipe, resulting in adhesion to the wafer to badly affect the performance of the semiconductor. If the dust continuously stays at the adhered portion, no special trouble occurs. Therefore, in order to avoid the floating of the dust during the breakage of the vacuum, an apparatus for gradually increasing the gas flow rate is used.

The problem of the adhesion of the reaction product (dust) by the reaction gas is not limited to the high vacuum valve for the discharge passage. The problem also arises in the high vacuum valve for the transport passage. In order to avoid the adhesion of the dust, the outer portion of the valve chamber has been hitherto heated with a heater. When the outer portions of the main valve body or the valve body are heated, the valve plug and the shaft of the high vacuum valve (gate valve) for the transport passage and the valve plug and the bellows of the high vacuum valve (L-type valve) for the discharge passage receive the radiant heat from the surroundings.

However, the high vacuum valve has a valve plug-driving section (actuator) in a low temperature state for displacing the valve plug. The heat, which is transferred to the valve plug, escapes through the valve shaft toward the valve plug-driving section at the low temperature. When the heater is arranged at the outside or the inside of the main valve body or the valve body to further heat the valve plug with the heater, a problem arises in an insulating member of a lead wire of the heater due to the high temperature.

An object of the present invention is to provide a high vacuum valve for a transport passage, which makes it possible to avoid the transfer of the heat of a valve plug to a low temperature portion from the valve plug via a valve shaft and which makes it possible to simplify a mechanism for swinging the valve to press the valve plug against a valve seat.

Another object of the present invention is to provide a high vacuum valve which makes it possible to obtain a uniform temperature distribution by broadly dispersing the heat from a heater by using, for a main valve body or a body, a stainless steel material having strength and corrosion resistance.

SUMMARY OF THE INVENTION

According to a first aspect of the present invention, there is provided a high vacuum valve comprising a first opening and a second opening formed through a front surface wall and a back surface wall of a main valve body having a valve chamber at the inside respectively; a valve seat formed at an inner portion of the first opening or the second opening; and a valve plug connected to a proximal end of a valve shaft for making rectilinear motion; the valve shaft being inserted in a non-contact state into a central bore of an upper wall of the main valve body; a side surface of the valve shaft at the outside of the valve chamber being covered with a bellows in a non-contact state; an air-tight state being given between a forward end of the bellows and a forward end of the valve shaft; and an air-tight state being given between a proximal end of the bellows and surroundings of the central bore of the upper wall; in which the valve plug arrives at a position opposed to the valve seat in accordance with the rectilinear motion of the valve shaft; and then the valve plug is pressed against the valve seat in accordance with swinging motion of the valve shaft to close a valve; wherein a heater is arranged in a tight contact manner in the valve shaft; and a wiring line for supplying electric power from the outside of the high vacuum valve is connected to the heater.

According to a second aspect of the present invention, there is provided a high vacuum valve comprising a plurality of ports formed to make communication with a valve chamber of a valve body via tubes; a bonnet connected to an upper portion of the valve body; and a valve seat formed at a flow passage for connecting the valve chamber to one of the tubes; the flow passage being closed by allowing a valve plug to make contact with the valve seat; and the flow passage being opened by allowing the valve plug to make separation from the valve seat; in which a valve shaft fixed to the valve plug is inserted through a central bore of the bonnet; wherein a heater is arranged in a tight contact manner in the valve shaft; and a wiring line for supplying electric power from the outside of the high vacuum valve is connected to the heater.

According to a third aspect of the present invention, there is provided a high vacuum valve comprising a first opening and a second opening formed through a front surface wall and a back surface wall of a main valve body having a valve chamber at the inside respectively; a valve seat formed at an inner portion of the first opening or the second opening; and a valve plug connected to a proximal end of a valve shaft for making rectilinear motion; the valve shaft being inserted in a non-contact state into a central bore of an upper wall of the main valve body; a side surface of the valve shaft at the outside of the valve chamber being covered with a bellows in a non-contact state; an air-tight state being given between a forward end of the bellows and a forward end of the valve shaft; and an air-tight state being given between a proximal end of the bellows and surroundings of the central bore of the upper wall; in which the valve plug arrives at a position opposed to the valve seat in accordance with the rectilinear motion of the valve shaft; and then the valve plug is pressed against the valve seat in accordance with swinging motion of the valve shaft to close a valve; wherein a cap member is connected to an upper portion of the valve shaft; support point rollers connected to lower portions of the cap member are engaged with support point grooves; guide rollers connected to upper portions of the cap member are engaged with cam grooves of a transmission member; the transmission member is movable downwardly to move the guide rollers along the cam grooves when the support point rollers are located at proximal ends of the support point grooves; and thus the valve shaft makes swinging movement in a direction to press the valve plug against the valve seat.

According to a fourth aspect of the present invention, there is provided the high vacuum valve as defined in the first aspect; wherein a cap member is connected to an upper portion of the valve shaft; support point rollers connected to lower portions of the cap member are engaged with support point grooves; guide rollers connected to upper portions of the cap member are engaged with cam grooves of a transmission member; the transmission member is movable downwardly to move the guide rollers along the cam grooves when the support point rollers are located at proximal ends of the support point grooves; and thus the valve shaft makes swinging movement in a direction to press the valve plug against the valve seat.

According to a fifth aspect of the present invention, there is provided the high vacuum valve as defined in the third or fourth aspect; wherein the transmission member is connected to output shafts of actuators; the transmission member and the cap member are connected to one another by the aid of guide rods so that they are not separated from each other by a space therebetween of not less than a preset distance; a spring is installed between the transmission member and the cap member; and the transmission member and the cap member are urged in directions to make separation from each other.

According to a sixth aspect of the present invention, there is provided the high vacuum valve as defined in the first or fifth aspect; wherein the main valve body or the valve body is arranged with a single heater or a plurality of heaters.

According to a seventh aspect of the present invention, there is provided a high vacuum valve comprising a heating unit including a body made of stainless steel arranged with a single heater or a plurality of heaters; a single sheet or a plurality of sheets of heat conduction plates made of metal having a high coefficient of thermal conductivity arranged in a tight contact manner on a surface of the body; and the heater arranged on a surface of each of the heat conduction plates; wherein an entire surface of the heat conduction plate and a surface of the body are covered with a cover made of a heat-insulating material while being separated therefrom by a predetermined spacing distance; heat from the heater having a small heating area is transferred over a wide range of the body via the heat conduction plate; a natural convection is generated in a closed space between the cover and the body; and the heat is transferred over the wide range of the body in accordance with natural convection heat transfer. The predetermined spacing distance referred to above is a spacing distance which is suitable to generate the natural convection.

According to an eighth aspect of the present invention, there is provided the high vacuum valve as defined in the seventh aspect; wherein the heater to be used is a thermistor, and the heat conduction plate to be used is made of copper or aluminum.

BRIEF DESCRIPTION OF THE DRAWINGS

FIG. 1 shows an embodiment of a high vacuum valve according to the present invention, wherein FIG. 1(a) shows a back view with partial cross section, and FIG. 1(b) shows a left side view illustrating a part of FIG. 1(a) with cross section;

FIG. 3(a) illustrates a magnified view illustrating major components shown in

FIG. 1(b), FIG. 3(b) shows a magnified plan view illustrating a transmission member shown in FIG. 1(a)

BEST MODE FOR CARRYING OUT THE INVENTION

Figure 2:
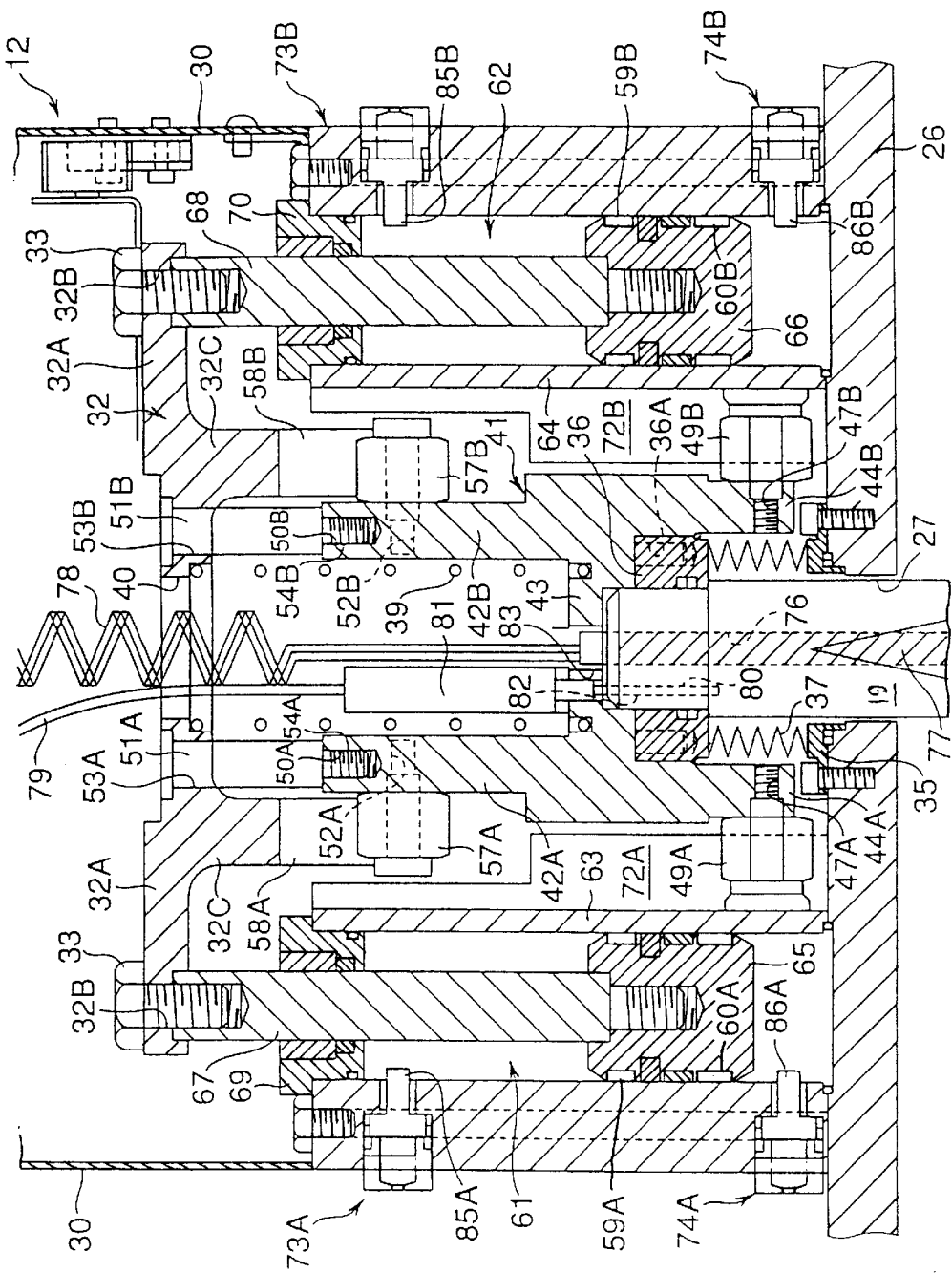
FIG. 2 shows a magnified view illustrating a valve plug-driving section shown in FIG. 1(a)

FIG. 1(a), FIG. 1(b), FIG. 2, FIG. 3(a), FIG. 3(b), and FIG. 3(c) show an embodiment of a high vacuum valve for a transport passage according to the present invention. In the description of the embodiment, the left side of FIG. 1(b) as one faces is referred to as the front surface, and the right surface as one faces is referred to as the back surface. Except for the above, explanation will be made in conformity with the directions as depicted in the drawings.

The high vacuum valve includes a main valve body 11 disposed at a downward position and a valve plug-driving section 12 disposed at an upward position. The main valve body 11 has a rectangular parallelepiped-shaped configuration with a first opening 14 and a second opening 15 having substantially rectangular opening surfaces formed through a front surface wall 22 (left side wall in FIG. 1(b)) and a back surface wall 23 (right side wall in FIG. 1(b)) respectively. A valve chamber 16 is formed in the main valve body 11 by a bottom wall 21, side walls 25A, 25B, the front surface wall 22, the back surface wall 23, and an upper wall 26. The respective walls are fixed by means of an appropriate method, and the valve chamber 16 is closed (see FIGS. 1(a) and 3(a)).

Figure 3A:
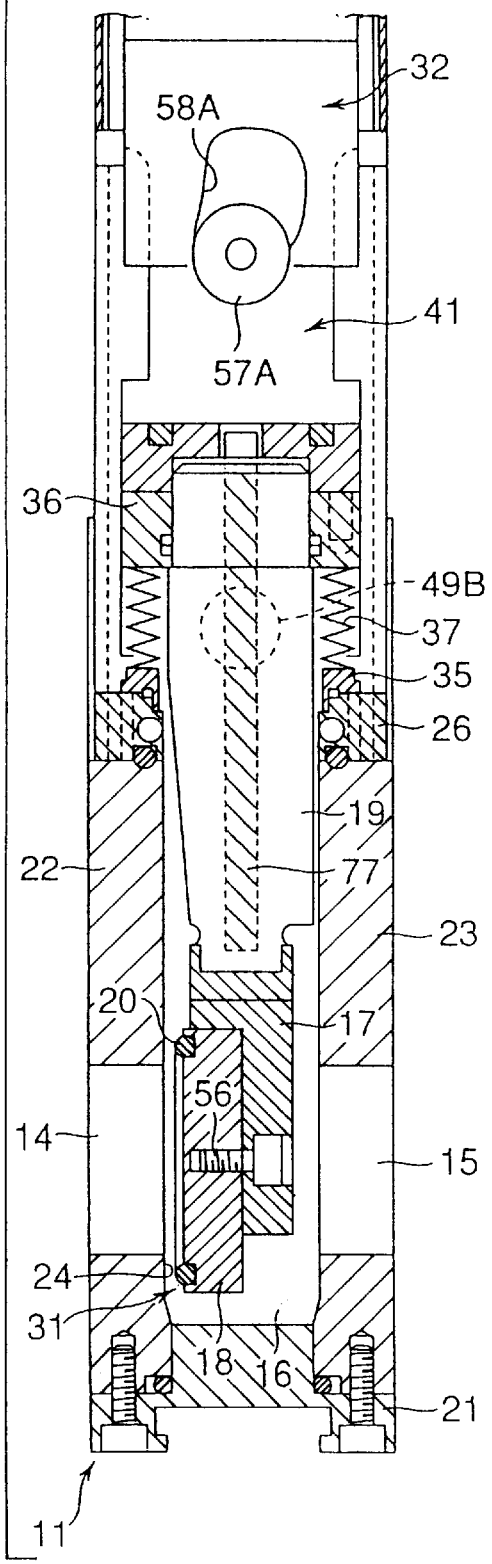

As shown in FIG. 3(a), a plate-shaped valve plug 18 is connected to the lower end of a columnar valve shaft 19 by the aid of a sub-plate 17 in the valve chamber 16. The valve plug 18 and the valve shaft 19 are inserted in a state capable of making rectilinear motion and swinging movement. The valve plug 18 is fixed to the lower end of the valve shaft 19, for example, by means of a bolt 56 or the like. A concave groove is formed in the vicinity of the outer circumference of the rectangular front surface of the valve plug 18. A seal member 20 is installed to the concave groove. The peripheral portion of the first opening 14 disposed on the inner side of the front surface wall 22 serves as a valve seat 24. When the seal member 20 is pressed against the valve seat 24, the communication between the first opening 14 and the second opening 15 is blocked. When the seal member 20 is separated from the valve seat 24, the first opening 14 and the second opening 15 are communicated with each other. A valve 31 is formed by the valve plug 18 and the valve seat 24.

The valve plug-driving section 12 is connected onto the upper wall 26 of the main valve body 11. As shown in FIG. 2, a lower end of a cylinder tube 63 of an actuator 61 is connected on the left side of the upper wall 26, and a lower end of a cylinder tube 64 of an actuator 62 is connected on the right side of the upper wall 26. Pistons 65, 66 are slidably fitted at the inside of the cylinder tubes 63, 64 respectively. Piston rods 67, 68, which are connected to the pistons 65, 66, are inserted through central holes of the rod covers 69, 70 respectively. Upper lock grooves 59A, 59B and lower lock grooves 60A, 60B are formed on the pistons 65, 66 respectively. Upper end lock mechanisms 73A, 73B and lower end lock mechanisms 74A, 74B are arranged at upper end portions and lower end portions of the cylinder tubes 63, 64 respectively. The lower lock grooves 60A, 60B are fitted and locked to lock pistons 86A, 86B of the lower end lock mechanisms 74A, 74B at lower end positions of the pistons 65, 66. Similarly, the upper lock grooves 59A, 59B are fitted and locked to lock pistons 85A, 85B of the upper end lock mechanisms 73A, 73B at upper end positions of the pistons 65, 66.

Stepped holes 32B are formed at both end portions of an upper plate section 32A of the transmission member 32, to which upper ends of the piston rods 67, 68 are fitted at large diameter portions on the lower side of the stepped holes 32B. Bolts 33 are inserted into small diameter portions on the upper side of the stepped holes 32B, and then they are screwed into screw holes at the upper ends of the piston rods 67, 68. Thus, the upper ends of the piston rods 67, 68 are connected to the transmission member 32. A lower end on the left side of a cover 30 folded to have a gate-shaped configuration is fixed to an upper portion on the left side of the cylinder tube 63. A lower end on the right side of the cover 30 is fixed to an upper end on the right side of the cylinder tube 64. Thus, the valve plug-driving section 12 is protected thereby.

A stepped central bore 27 is formed through a central portion of the upper wall 26. A brim-equipped guide ring 35, which is disposed at an upward position, is fitted to the central bore 27. The brim-equipped guide ring 35 is fixed to the upper wall 26 by means of bolts. The space between the brim-equipped guide ring 35 and the upper wall 26 is tightly sealed by an O-ring. An upper portion of the inner circumferential surface of the central bore 27 is covered with the brim-equipped guide ring 35. The valve shaft 19 is inserted into the brim-equipped guide ring 35 and the stepped central bore 27 so that the non-contact state is maintained. An annular ring 36 is fitted to a small diameter portion at the upper end of the valve shaft 19. The space between the annular ring 36 and the small diameter portion of the valve shaft 19 is tightly sealed by an O-ring. An upper end of a bellows 37 made of metal is connected in an air-tight manner by means of welding to an annular flat surface of the lower surface of the annular ring 36. A lower end of the bellows 37 is connected in an air-tight manner by means of welding to the surface of the guide ring 35. The upper side portion of the valve shaft 19 is inserted into the inside of the bellows 37 so that the non-contact state is maintained. The space between the upper end of the valve shaft 19 and the guide ring 35 is tightly sealed by the bellows 37. The space between the inside of the bellows 37 and the outside of the valve shaft 19 communicates with the valve chamber 16. However, the valve chamber 16 makes no communication with the atmospheric air via any gap between the valve shaft 19 and the guide ring 35. The portions of the valve chamber 16 except for the first opening 14 and the second opening 15 are tightly sealed in an air-tight manner. The valve chamber 16 communicates with the outside via only the first opening 14 and the second opening 15.

As shown in FIG. 2, a cap member 41, which has a substantially H-shaped vertical cross section and which has a substantially rectangular configuration as viewed from a position over an upper surface, is fixed to the upper end of the valve shaft 19. The cap member 41 includes parallel plate-shaped connecting sections 42A, 42B which protrude upwardly, an intermediate section 43 which includes a small diameter hole, a central hole, and a large diameter hole, and parallel plate-shaped support sections 44A, 44B which protrude downwardly. These components are formed in an integrated manner. An annular ring 36 is fitted to the large diameter hole of the intermediate section 43 of the cap member 41. Unillustrated bolts are screwed into bolt holes 36A of the annular ring 36 through unillustrated insertion holes of the intermediate section 43. Accordingly, the cap member 41 and the annular ring 36 are connected to one another. Screw holes 47A, 47B, which are directed laterally, are formed in the support sections 44A, 44B. Male screws of support point rollers 49A, 49B are screwed thereto from the outside to make connection respectively. With reference to FIG. 2, support point grooves 72A, 72B, each of which has a vertical length longer than a horizontal length, are formed on the right side of the cylinder tube 63 and on the left side of the cylinder tube 64 respectively. Upper ends of the support point grooves 72A, 72B are open, and lower ends of the support point grooves 72A, 72B serve as support points. The support point rollers 49A, 49B are rollably guided in the support point grooves 72A, 72B. The support point rollers 49A, 49B are movable in the vertical direction along the support point grooves 72A, 72B. The support sections 44A, 44B are disposed at the outside of the bellows 37. The support sections 44A, 44B and the bellows 37 are maintained in the non-contact state.

Screw holes 52A, 52B, which are open to the outside, are formed in the connecting sections 42A, 42B of the cap member 41. Male screws of guide rollers 57A, 57B are screwed thereto from the outside to make connection respectively. The transmission member 32 is formed with two plate-shaped members 32C which protrude downwardly and which are parallel to one another. Cam grooves 58A, 58B with open lower ends are formed for the respective plate-shaped members 32C. Guide rollers 57A, 57B are always engaged with the cam grooves 58A, 58B. A stepped central hole 40 is formed through a central portion of the plate section 32A of the transmission member 32. The stepped portion of the central hole 40 serves as an upper receiving seat for a spring 39. A lower receiving seat for the spring 39 is formed on the upper surface of the intermediate section 43 of the cap member 41. The transmission member 32 and the cap member 41 are urged in directions to make separation from each other in accordance with the resilient force of the spring 39 installed between the upper and lower receiving seats.

Figure 3B:
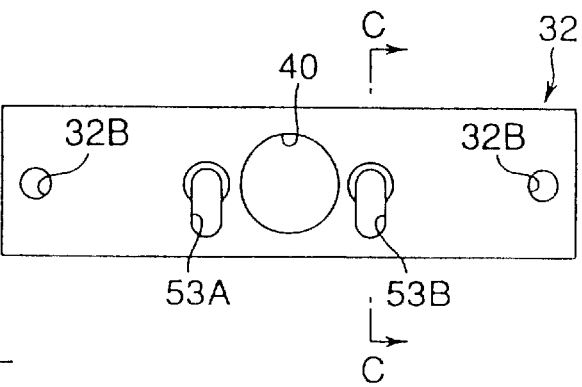
Figure 3C:
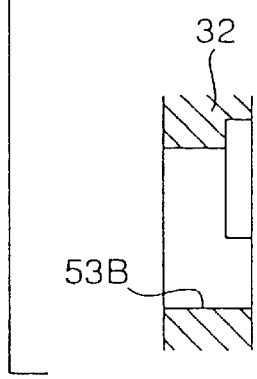
FIG. 3(c) shows a sectional view taken along a line C—C shown in FIG. 3(b)

Stepped guiding long bores 53A, 53B are formed on the left and right sides of the central hole 40 of the transmission member 32 (see FIGS. 3b and 3c). Brim-equipped guide rods 51A, 51B are slidably inserted into the guiding long bores 53A, 53B. Male screws 54A, 54B are formed at lower ends of the guide rods 51A, 51B. The male screws 54A, 54B are screwed into screw holes 50A, 50B of the connecting sections 42A, 42B of the cap member 41. The cap member 41 is connected to the transmission member 32 so that they are not separated from each other by not less than a preset distance and they are mutually movable. The valve shaft 19 receives the force in the direction to make separation from the transmission member 32 in accordance with the resilient force of the spring 39. The cam grooves 58A, 58B have inclined sections which are slightly inclined backwardly at upper positions continuously to the slight vertical planes at the lower ends. When the support point rollers 49A, 49B are separated from the lower ends of the support point grooves 72A, 72B, and when the support point rollers 49A, 49B arrive at the lower ends of the support point grooves 72A, 72B, then the guide rollers 57A, 57B are engaged with the vertical planes at the lower ends of the cam grooves 58A, 58B. In this situation, the guide rods 51A, 51B are fitted to the large diameter portions at the upper ends of the brim-equipped guiding bores 53A, 53B, and the guide rods 51A, 51B do not protrude from the upper surface of the transmission member 32.

As shown in FIG. 2, a shaft hole 76, which extends from the upper end to a portion in the vicinity of the lower end, is formed on the central axis of the valve shaft 19. The shaft hole 76 is designed to have a size of such a degree that the cross-sectional second moment of the shaft is not decreased. A rod-shaped heater 77 is manufactured to have approximately the same diameter as that of the shaft hole 76. The heater 77 is fitted to the shaft hole 76, and it is arranged in a tight contact manner. Thus, the heater 77 is prevented from disengagement. The upper end of the heater 77 protrude from the upper end of the valve shaft 19, and it is inserted in a non-direct state into the small diameter hole of the intermediate section 43 of the cap member 41. A lower end of an expandable/contractible cord 78, which is inserted from the outside of the high vacuum valve, is connected to the upper end of the heater 77. The electric power is supplied to the heater 77 by the aid of the expandable/contractible cord 78. The heat of the heater 77 is transferred to the shaft 19.

A fitting hole 80, which has a diameter smaller than that of the shaft hole 76, is formed at a position separated from the shaft hole 76 at the upper end of the valve shaft 19. An insertion hole 83 is formed through the intermediate section 43 of the cap member 41 over the fitting hole 80. A support section of a temperature sensor 81 is fitted to the insertion hole 83. A detecting section 82 of the temperature sensor 81 is fitted to the fitting hole 80 in a tight contact manner so that the temperature of the valve shaft 19 is detectable. The output of the temperature sensor 81 is inputted into an unillustrated controller. The controller is used to control the electric power to be supplied to the heater 77. Thus, the valve shaft 19 can be maintained at a desired temperature. When a predetermined thermistor of the heating type is used in place of the heater 77, a desired temperature can be automatically obtained without using the temperature sensor 81.

Figure 5:
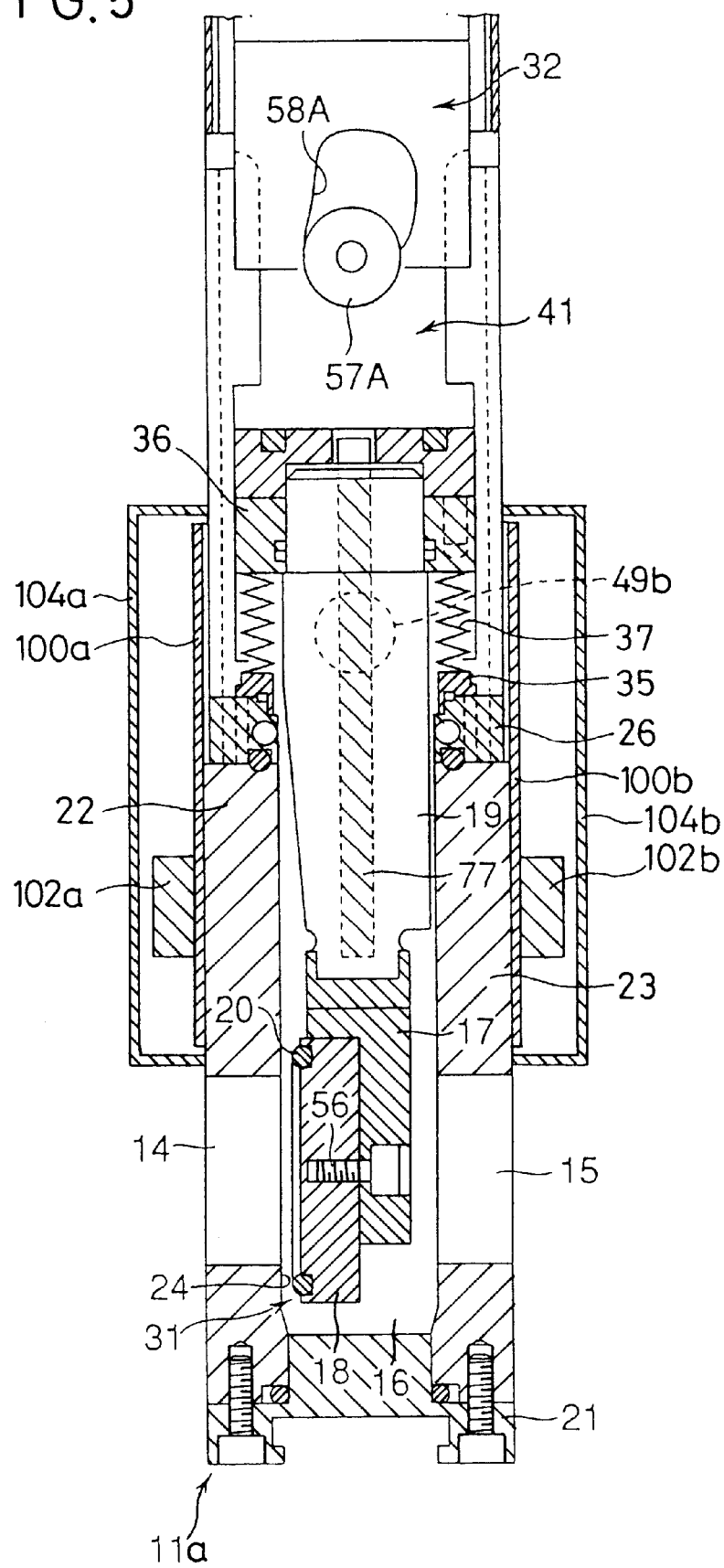
FIG. 5 shows a vertical sectional view illustrating a high vacuum valve according to another embodiment.

As shown in FIG. 5, the following arrangement may be available. That is, a pair of heat conduction plates 100a, 100b made of metal having a high coefficient of thermal conductivity are arranged in a tight contact manner on a front surface wall 22 and on a back surface wall 23 at the outside of a main valve body 11a made of stainless steel formed to have a rectangular parallelepiped-shaped configuration. Heaters 102a, 102b are arranged on surfaces of the heat conduction plates 100a, 100b respectively. Covers 104a, 104b made of a heat-insulating material are used to cover the main valve body 11a. Each of the heat conduction plates 100a, 100b may be composed of a single sheet, or each of them may be constructed by stacking a plurality of sheets.

In this arrangement, the heat from the heaters 102a, 102b is transferred over a wide range of the main valve body 11a via the heat conduction plates 100a, 100b. The natural convection is generated in a closed space between the covers 104a, 104b and the main valve body 11a. The heat is transferred over the wide range of the main valve body 11a owing to the heat transfer effected by the natural convection.

It is preferable that the heater 102a, 102b to be used is a thermistor, and the heat conduction plate 100a, 100b to be used is made of copper or aluminum.

Next, explanation will be made for the operation of the embodiment of the high vacuum valve according to the present invention. In the fully open state of the valve 31 shown in FIG. 3(a), the pistons 65, 66 are located at the upward movement stroke ends of the actuators 61, 62, and the transmission member 32 is located at the upward movement end. In this situation, the lock pistons 85A, 85B of the upper end lock mechanisms 73A, 73B are fitted to the upper lock grooves 59A, 59B of the pistons 65, 66 respectively, and the pistons 65, 66 are locked at the upper end positions. As described above, the transmission member 32, the cap member 41, and the valve shaft 19 are connected so that they are not separated from each other by not less than the predetermined distance. Accordingly, in the fully open state of the valve, the predetermined distance is maintained for the spacing distance concerning the transmission member 32, the cap member 41, and the valve shaft 19. When the predetermined distance is maintained, then the guide rollers 25 57A, 57B are engaged with the lower end vertical surfaces of the cam grooves 58A, 58B, and the support point rollers 49A, 49B are engaged with the upper ends of the support point grooves 72A, 72B.

When the compressed air is allowed to flow into the rod-side chambers (upper side chambers of the pistons 65, 66) of the actuators 61, 62, then the lock pistons 85A, 85B of the upper end lock mechanisms 73A, 73B are moved rearwardly in accordance with the pressure of the compressed air to release the lock, and the downward movement (frontward movement) of the pistons 65, 66 is started. During this process, the transmission member 32 and the valve shaft 19 perform the downward movement and the rectilinear motion while maintaining the predetermined distance described above, and the valve plug 18 is moved in the direction to close the valve 31. The left and right ends of the plate section 32A of the transmission member 32 are connected by the bolts 33 respectively to the upper ends of the piston rods 67, 68 of the actuators 61, 62, and the support point rollers 49A, 49B at the lower ends of the cap member 41 are engaged with the support point grooves 72A, 72B. Therefore, when the valve shaft 19 performs the downward movement and the rectilinear motion, the valve shaft 19 makes no swinging movement in the frontward and rearward directions and in the left and right directions. Therefore, when the valve shaft 19 performs the downward movement and the rectilinear motion, the outer circumferential surface of the valve shaft 19 does not make contact with the bellows 37, the guide ring 35, and the upper wall 26 as well.

The support point rollers 49A, 49B, which are connected to the cap member 41, contact with the lower ends of the support point grooves 72A, 72B at the downward movement stroke end of the valve shaft 19. The downward movement of the valve shaft 19 and the cap member 41 is stopped. Accordingly, the valve shaft 19, the cap member 41, and the valve plug 18 arrive at the downward movement end positions (downward movement position of the valve plug as shown in FIG. 2). In this situation, as shown in the drawing, the guide rollers 57A, 57B are engaged with the lower end vertical surfaces of the cam grooves 58A, 58B.

Even when the valve shaft 19 and the cap member 41 arrive at the downward movement end positions, then the transmission member 32 continues the downward movement motion, and it is moved downwardly against the resilient force of the spring 39. The guide rollers 57A, 57B are gradually moved backwardly along the cam grooves 58A, 58B in accordance with the downward movement of the cam grooves 58A, 58B of the transmission member 32. According to the movement, the valve shaft 19 makes swinging movement about the center of the support point rollers 49A, 49B. The lower end of the valve shaft 19 and the valve plug 18 are gradually moved frontwardly. The seal member 20 of the valve plug 18 is pressed against the valve seat 24 of the front surface wall 22 to arrive at the fully closed state of the valve 31. In this situation, the lock pistons 86A, 86B of the lower end lock mechanisms 74A, 74B are fitted to the lower lock grooves 60A, 60B of the pistons 65, 66 respectively. The pistons 65, 66 are locked at the lower end positions. When this state is maintained and continued for a long period of time, it is possible to temporarily stop the supply of the compressed air for operating the actuators 61, 62 (the supply of the compressed air can be also temporarily stopped at the upper end positions of the pistons 65, 66 in the same manner as described above). The guide rods 51A, 51B protrude upwardly from the upper end side of the transmission member 32. The guide locks 51A, 51B also make swinging movement simultaneously with the swinging movement of the valve shaft 19. Therefore, in order not to obstruct the swinging movement, the guiding long bores 53A, 53B are manufactured to have the elliptic configuration so that they are long in the frontward and rearward directions.

When it is intended to change the valve 31 from the fully closed state to the valve plug downward movement state, the compressed air is allowed to flow into the head-side chambers (lower side chambers of the pistons 65, 66) of the actuators 61, 62. By doing so, the lock pistons 86A, 86B of the lower end lock mechanisms 74A, 74B are moved rearwardly to release the lock in accordance with the pressure of the compressed air. The transmission member 32 performs the upward movement (rearward movement) and the rectilinear motion by a predetermined distance. The resilient force of the spring 39 is set to be larger than the total sum of the weight of the valve plug 18 and the force to lift up the transmission member 32 in accordance with the engagement between the guide rollers 57A, 57B and the cam grooves 58A, 58B. Therefore, when the transmission member 32 is allowed to perform the upward movement and the rectilinear motion, the cap member 41, the valve shaft 19, and the support point rollers 49A, 49B are maintained at the lower end positions owing to the resilient force of the spring 39. The transmission member 32 is moved upwardly while making the engagement of the cam grooves 58A, 58B with the guide rollers 57A, 57B. The vertical flat surface portions of the cam grooves 58A, 58B are engaged with the guide rollers 57A, 57B. Consequently, the state is given, in which the valve plug 18 is separated from the valve seat 24 at the valve plug downward movement position.

When it is intended to change the valve 31 from the separated state to the fully open state, the pistons 65, 66 of the actuators 61, 62 are allowed to further perform the upward movement and the rectilinear motion. The valve shaft 19 is moved upwardly without making any swinging movement in the frontward and rearward directions and without making any swinging movement in the left and right directions, in the same manner as in the downward movement and the rectilinear motion of the pistons 65, 66. When the valve shaft 19 performs the upward movement and the rectilinear motion, the outer circumferential surface of the valve shaft 19 does not contact with the bellows 37, the guide ring 35, and the central bore 27 as well.

The embodiment of the present invention has been explained while assuming the attitude in which the high vacuum valve is disposed in the upstanding manner in the vertical direction. However, it is a matter of course that the high vacuum valve is operated in the same manner as in the upstanding attitude even when the attachment attitude of the high vacuum valve is inverted upside down or when the attachment attitude is directed in the lateral direction.

Figure 4A:
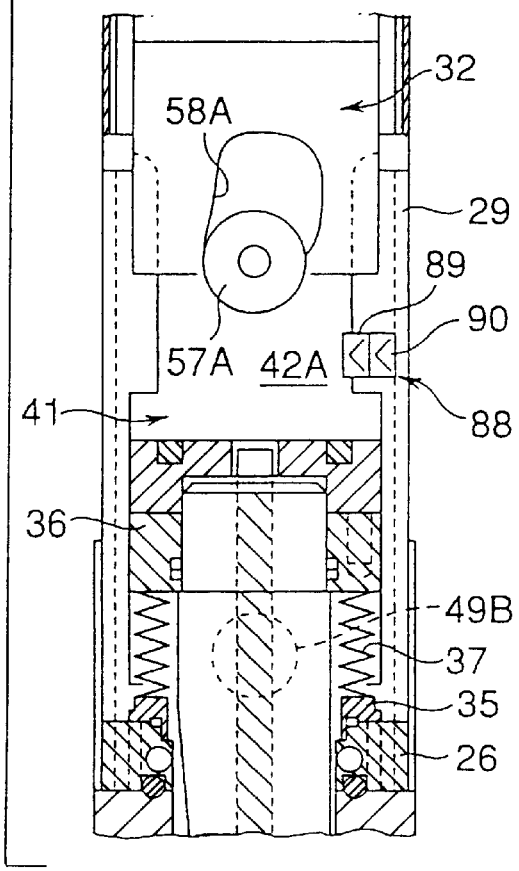
FIG. 4(a) shows a magnified view illustrating major components, in which a plug connector section is arranged (corresponding to an upper part of FIG. 3(a))
Figure 4B:
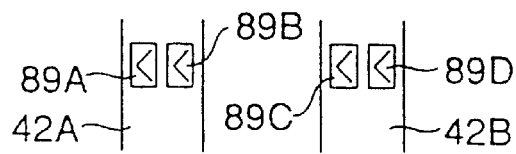
FIG. 4(b) shows an arrangement of a movable section of the plug connector section as viewed from a backward position.

FIGS. 4(a) and 4(b) show major components concerning a case in which a plug connector section 88 is arranged for the expandable/contractible cord 78 of the heater 77 and for the lead wire 79 of the temperature sensor 81 in the embodiment of the present invention. It is known that when the high vacuum valve of the present invention is arranged for the transport passage for transporting, for example, an integrated circuit or a part thereof from one vacuum processing chamber to another vacuum processing chamber, the period of time, during which the valve 31 is closed, is longer than the period of time during which the valve 31 is open. It has been revealed that the transfer of the heat from the valve plug 18 via the valve shaft 19 to the low temperature portion can be avoided by supplying the electric power to the heater 77 only when the valve 31 is closed. Accordingly, the plug connector section 88 is arranged so that the electric power is supplied by the aid of the plug connector section 88 only when the valve 31 is closed, and the electric power is not supplied when the valve 31 is not closed.

A movable section 89 of the plug connector section 88 is fixed to the back surface of each of the connecting sections 42A, 42B of the cap member 41. A fixation section 90 of the plug connector section 88 is fixed at a position opposed to the movable section 89 at the front surface of the rear cover 29. As shown in FIG. 4(b), the movable sections 89A, 89B for the electric power are fixed to the back surface of the connecting section 42A, and the movable sections 89C, 89D for the sensor are fixed to the back surface of the connecting section 42B. As for the fixation sections 90, an unillustrated fixation section for the electric power and a fixation section for the sensor are arranged as well. When the valve 31 is open, the movable section 89 is not engaged with the fixation section 90. However, when the shaft 19 and the cap member 41 make the swinging movement to close the valve 31, the movable section 89 and the fixation section 90 are engaged (plugged) with each other. The contact of the movable section 89 contacts with the contact of the fixation section 90. The current is allowed to flow between the movable section 89 and the fixation section 90. The electric power, which passes through the movable sections 89A, 89B for the electric power, is supplied to the heater 77. The output of the temperature sensor 81 flows through the movable sections 89C, 89D for the sensor. When the thermistor is used as the heater 77, it is unnecessary to provide the plug connector sections for the sensor.

As shown in FIG. 5, a pair of heat conduction plates 100a, 100b made of metal having a high coefficient of thermal conductivity are arranged in a tight contact manner on a front surface wall 22 and a back surface wall 23 at the outside of a main valve body 11a made of stainless steel formed to have a rectangular parallelepiped-shaped configuration. Heaters 102a, 102b are arranged on the surfaces of the heat conduction plates 100a, 100b respectively. Covers 104a, 104b made of a heat-insulating material are used to cover the main valve body 11a. Accordingly, the heat from the heaters 102a, 102b is transferred over a wide range of the main valve body 11a via the heat conduction plates 100a, 100b. The main valve body 11a is heated over the wide range owing to the heat transfer effected by the natural convection generated in the closed space between the covers 104a, 104b and the main valve body 11a.

Industrial Applicability

According to the present invention, the heater is arranged in the valve shaft in the tight contact manner in the high vacuum valve, and the wiring line, which is used to supply the electric power from the outside of the high vacuum valve, is connected to the heater. Therefore, it is possible to prevent the transfer of the heat from the valve plug via the valve shaft to the low temperature portions. Further, it is also possible to transfer the heat from the valve shaft to the valve plug so that the temperature of the valve plug is further raised. Further, the valve plug is heated by using the heater which is arranged for the main valve body or the valve body, and the valve shaft is maintained at the same temperature as that of the valve plug by using the heater of the valve shaft. Thus, it is possible to completely avoid the transfer of the heat from the valve plug via the valve shaft to the low temperature portions.

According to the present invention, the cap member is connected to the upper portion of the valve shaft, the support point rollers connected to the lower portions of the cap member are engaged with the support point grooves, and the guide rollers connected to the upper portions of the cap member are engaged with the cam grooves of the transmission member. When the support point rollers are located at the proximal ends of the support point grooves, the transmission member is moved downwardly to move the guide rollers along the cam grooves. Accordingly, the valve shaft makes the swinging movement in the direction to press the valve plug against the valve seat. As described above, it is possible to simplify the mechanism for swinging the valve shaft to press the valve plug against the valve seat in the high vacuum valve for the transport passage.

Further, according to the present invention, it is possible to use, for the body, the stainless steel which is excellent in strength and corrosion resistance when the application is made to the body, for example, of the high vacuum valve, the high vacuum chamber, and the high vacuum piping. The heat from the heater is transferred to the body over the wide range in accordance with the heat conduction via the heat conduction plate made of metal having the high coefficient of thermal conductivity. The natural convection is generated in the closed space between the cover and the body. The heat is transferred to the wide range of the body owing to the transfer by the natural convection. Therefore, the temperature of the body can be made to have the uniform value of the same degree as that obtained when the aluminum material is used for the body.

What is claimed is:

1. A high vacuum valve comprising a first opening (14) and a second opening (15) formed through a front surface wall (22) and a back surface wall (23) of a main valve body (11) having a valve chamber (16) at the inside respectively; a valve seat (24) formed at an inner portion of said first opening (14) or said second opening (15); and a valve plug (18) connected to a proximal end of a valve shaft (19) for making rectilinear motion; said valve shaft (19) being inserted in a non-contact state into a central bore (27) of an upper wall (26) of said main valve body (11); a side surface of said valve shaft (19) at the outside of said valve chamber (16) being covered with a bellows (37) in a non-contact state; an air-tight state being given between a forward end of said bellows (37) and a forward end of said valve shaft (19);

and an air-tight state being given between a proximal end of said bellows (37) and surroundings of said central bore (27) of said upper wall (26); in which said valve plug (18) arrives at a position opposed to said valve seat (24) in accordance with said rectilinear motion of said valve shaft (19); and then said valve plug (18) is pressed against said valve seat (24) in accordance with swinging motion of said valve shaft (19) to close a valve (31); wherein a heater (77) is arranged in a tight contact manner in said valve shaft (19); and a wiring line (78) for supplying electric power from the outside of said high vacuum valve is connected to said heater (77).

2. A high vacuum valve comprising a plurality of ports formed to make communication with a valve chamber (16) of a valve body (11) via tubes; a bonnet (26) connected to an upper portion of said valve body (11); and a valve seat (24) formed at a flow passage for connecting said valve chamber (16) to one of said tubes; said flow passage being closed by allowing a valve plug (18) to make contact with said valve seat (24); and said flow passage being opened by allowing said valve plug (18) to make separation from said valve seat (24); in which a valve shaft (19) fixed to said valve plug (18) is inserted through a central bore of said bonnet (26); wherein a heater (77) is arranged in a tight contact manner in said valve shaft (19); and a wiring line for supplying electric power from the outside of said high vacuum valve is connected to said heater (77).

3. A high vacuum valve comprising a first opening (14) and a second opening (15) formed through a front surface wall (22) and a back surface wall (23) of a main valve body (11) having a valve chamber (16) at the inside respectively; a valve seat (24) formed at an inner portion of said first opening (14) or said second opening (15); and a valve plug (18) connected to a proximal end of a valve shaft (19) for making rectilinear motion; said valve shaft (19) being inserted in a non-contact state into a central bore (27) of an upper wall (26) of said main valve body (11); a side surface of said valve shaft (19) at the outside of said valve chamber (16) being covered with a bellows (37) in a non-contact state; an air-tight state being given between a forward end of said bellows (37) and a forward end of said valve shaft (19); and an air-tight state being given between a proximal end of said bellows (37) and surroundings of said central bore (27) of said upper wall (26); in which said valve plug (18) arrives at a position opposed to said valve seat (24) in accordance with said rectilinear motion of said valve shaft (19); and then said valve plug (18) is pressed against said valve seat (24) in accordance with swinging motion of said valve shaft (19) to close a valve (31); wherein a cap member (41) is connected to an upper portion of said valve shaft (19); support point rollers (49A, 49B) connected to lower portions of said cap member (41) are engaged with support point grooves (72A, 72B); guide rollers (57A, 57B) connected to upper portions of said cap member (41) are engaged with cam grooves (58A, 58B) of a transmission member (32); said transmission member (32) is movable downwardly to move said guide rollers (57A, 57B) along said cam grooves (58A, 58B) when said support point rollers (49A, 49B) are located at proximal ends of said support point grooves (72A, 72B); and thus said valve shaft (19) makes swinging movement in a direction to press said valve plug (18) against said valve seat (24).

4. The high vacuum valve according to claim 1, wherein a cap member (41) is connected to an upper portion of said valve shaft (19); support point rollers (49A, 49B) connected to lower portions of said cap member (41) are engaged with support point grooves (72A, 72B); guide rollers (57A, 57B) connected to upper portions of said cap member (41) are engaged with cam grooves (58A, 58B) of a transmission member (32); said transmission member (32) is movable downwardly to move said guide rollers (57A, 57B) along said cam grooves (58A, 58B) when said support point rollers (49A, 49B) are located at proximal ends of said support point grooves (72A, 72B); and thus said valve shaft (19) makes swinging movement in a direction to press said valve plug (18) against said valve seat (24).

5. The high vacuum valve according to claim 3, wherein said transmission member (32) is connected to output shafts (67, 68) of actuators (61, 62); said transmission member (32) and said cap member (41) are connected to one another by the aid of guide rods (51A, 51B) so that they are not separated from each other by a space therebetween of not less than a preset distance; a spring (39) is installed between said transmission member (32) and said cap member (41); and said transmission member (32) and said cap member (41) are urged in directions to make separation from each other.

6. The high vacuum valve according to claim 1, wherein said main valve body is arranged with a single heater or a plurality of heaters.

7. The high vacuum valve according to claim 2, wherein said valve body is arranged with a single heater or a plurality of heaters.

8. A high vacuum valve comprising a heating unit including a body (11a) made of stainless steel arranged with a single heater or a plurality of heaters (102a, 102b); a single sheet or a plurality of sheets of heat conduction plates (100a, 100b) made of metal having a high coefficient of thermal conductivity arranged in a tight contact manner on a surface of said body (11a); and said heater (102a, 102b) arranged on a surface of each of said heat conduction plates (100a, 100b); wherein an entire surface of said heat conduction plate (100a, 100b) and a surface of said body (11a) are covered with a cover (104a, 104b) made of a heat-insulating material while being separated therefrom by a predetermined spacing distance; heat from said heater (102a, 102b) having a small heating area is transferred over a wide range of said body (11a) via said heat conduction plate (100a, 100b); a natural convection is generated in a closed space between said cover (104a, 104b) and said body (11a); and said heat is transferred over said wide range of said body (11a) in accordance with natural convection heat transfer.

9. The high vacuum valve according to claim 8, wherein said heater to be used is a thermistor, and said heat conduction plate to be used is made of copper or aluminum.

* * * * *